June 21, 1938.  J. C. ADAMS  2,121,621
FRUIT JUICE EXTRACTOR
Filed Nov. 6, 1936
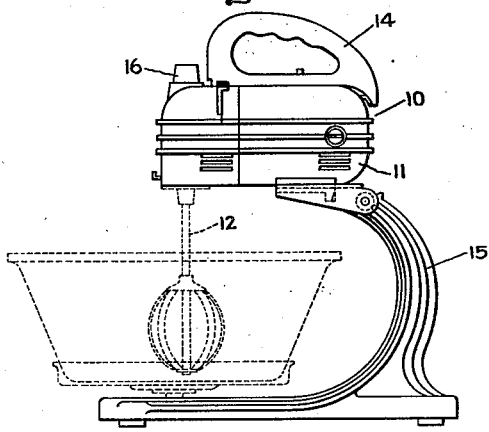
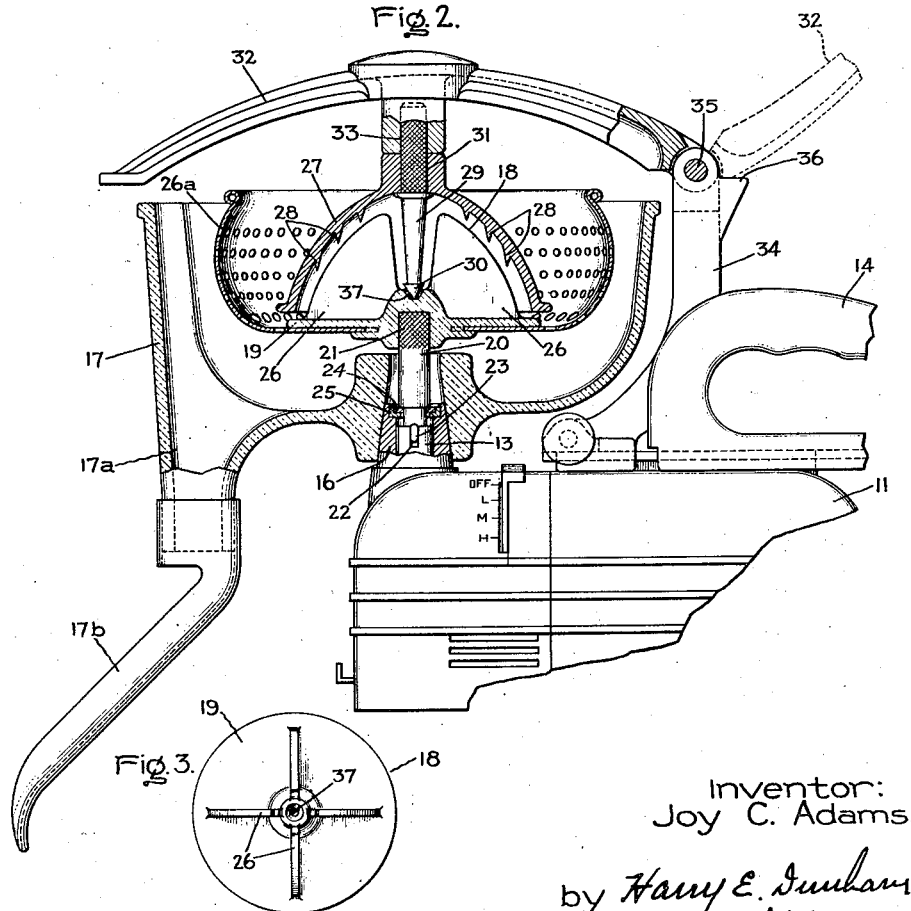
Inventor:
Joy C. Adams,
by Harry E. Dunham
His Attorney.

Patented June 21, 1938

2,121,621

UNITED STATES PATENT OFFICE 2,121,621

FRUIT JUICE EXTRACTOR

Joy C. Adams, Fairfield, Conn., assignor to General Electric Company, a corporation of New York Application November 6, 1936, Serial No. 109,432

4 Claims. (Cl. 146—3)

This invention relates to juice extractors, more particularly to devices of this character for extracting the juices from citrous fruits, such as oranges, lemons, grapefruit, limes and the like, and it has for its object the provision of an improved extractor of this character which is safe and convenient to operate and which is efficient in its operation.

While not limited thereto this invention is particularly applicable to fruit juice extractors having a power driven reamer which acts on the fruit held against it to break down the pulp and remove the juice, and wherein a holder is provided for the fruit arranged to support it and move it into extracting relation with the reamer.

This invention contemplates an improved fruit juice extractor of this character having an improved organization of parts arranged so that the fruit is held in proper relation with the extracting reamer for the most efficient and satisfactory juicing operation.

For a more complete understanding of this invention, reference should be had to the accompanying drawing in which Fig. 1 is an elevation of a power unit arranged to operate the juice extractor of this invention; Fig. 2 is an enlarged fragmentary view, mainly in section, of a fruit juice extractor arranged in accordance with this invention; and Fig. 3 is a plan view of an extracting reamer used in the fruit juice extractor of Fig. 2.

Referring to the drawing, this invention has been shown as applied to a fruit juice extractor intended to be used with the food mixing device described and claimed in the U. S. patent to Robert F. Bean, No. 2,103,928. It is to be understood, however, that this invention is not limited in its application to food mixing devices of this type or to food mixing devices in general, but that it may be a separate independent unit in itself.

As shown in Fig. 1, and as described in greater detail in the above mentioned U. S. patent to Robert F. Bean, the food mixing device of Fig. 1, which is used as a source of power for my juice extractor, is provided with a power unit 10 having a motor 11 arranged to drive through suitable gearing (not shown) and a beater element 12. The motor also drives through the gearing a shaft 13 (Fig. 2) which is accessible at the top of the power unit. The power unit 10 also comprises a handle 14 whereby it may be manipulated. A suitable standard 15 is provided to support the power unit.

Surrounding the shaft 13 is a protuberance 16 having the shape of a frustrum of a cone. This protuberance is arranged to support and secure a bowl 17 of the juice extracting device. As pointed out in the Bean patent, the handle 14 may be moved from its working position shown in Fig. 1 to a retractive position shown in Fig. 2 to provide room on top of the power unit for the juicer bowl. Preferably, the bowl 17 will be formed of glass. As shown, the glass bowl 17 has a discharge spout 17a upon which is mounted a discharge chute or channel member 17b. This latter member will be formed of any suitable metal, and will be secured to the spout 17a in any suitable manner.

Mounted within the bowl 17 is a rotary juice extracting reamer 18. This reamer has a base 19 in which is mounted a shaft 20 projecting from the bottom of the reamer. As shown, the shaft 20 has a knurled connection 21 with the base 19. The shaft 20 at its lower end is arranged to have a driving connection with the shaft 13 of the power unit. The shaft 13 of the power unit, which is hollow to receive the shaft 20, is provided in one side wall with a driving slot 22 which receives a driving tooth 23 on the shaft 20. Preferably, two slots 22 and two teeth 23 will be provided arranged opposite each other. The shaft 20 is provided with a thrust bearing 24 which rotates in a journal 25 arranged in the protuberance 16, as shown in Fig. 2.

The reamer 18 further comprises a plurality of reaming blades 26 arranged generally radially of the base 19, and spaced from each other circumferentially of the base, as clearly shown in Figs. 2 and 3. The inner edges of the blades, as shown, are spaced from each other.

If desired, a centrifugal strainer 26a may be mounted on the reamer.

A fruit holder 27 is provided for supporting the fruit and for holding it against the reamer 18 so that it need not be held by the fingers of the operator. The fruit holder 27 is of cup form and, as shown, has in general the shape of the contour of the extractor 18, and these two members have in general the shape of a half citrus fruit. On its inner wall, the cup 27 is provided with a plurality of pins 28 arranged to impale the fruit placed in the cup. The cup 27 is further provided at its center with a relatively large pin 29 having on its end an anchor 30. The pin 29 with its anchor is arranged to be directed through the center of the half fruit placed within the cup so as to secure it to the cup. The pins 28 assist in securing the fruit to the cup and also prevent relative rotary motion between the fruit and the cup. The pins 28 preferably will be formed integrally with the cup, whereas the pin 29 is formed as a separate member that is rigidly secured to the cup by a knurled connection 31.

The pin 29 is also secured to an operating arm 32 by a knurled connection 33. The pin 29 therefore secures the cup 27 to the operating arm 32. The arm 32 is pivotally mounted on a standard 34 by means of a pivot pin or shaft 35. The standard 34 is arranged to be mounted on the power unit 10, as described and claimed in the copending application of Robert F. Bean, Serial No. 109,431, filed November 6, 1936. The handle 32 is arranged to move between a retracted position shown in dotted lines in Fig. 2 and a working position shown in full lines in this figure. A suitable stop 36 is provided on the standard 34 to hold the arm in its retracted position. The pin 29 is located substantially in the center of the cup, and, when the cup is in the working position shown in Fig. 2, lies substantially in the axis of rotation of the shaft 20.

In the operation of the device, it will be understood that when the arm 32 is in its retracted position a half fruit such as a half orange, may be placed within the cup 27, and when so placed will be impaled by the pins 28 and 29. The arm 32 may then be moved from its retracted position toward its working position shown in Fig. 2 so as to carry the fruit into engagement with the reamer 18. The latter as it rotates crushes the pulp of the fruit as the latter is moved downwardly to extract the juice from the fruit.

It is very desirable and important in order to obtain the most efficient and satisfactory juicing operation to limit the movement of the supporting cup 27, and hence, of the fruit supported in it toward the reamer while extracting juice. This is because it is desirable not to press the rind of the fruit into the reamer with sufficient force to extract the bitter juices of the rind and mix them with the juice from the fruit. And yet, it is desirable that the cup be permitted to move downwardly sufficiently to permit the reamer 18 to extract all of the juice from the fruit, that is, so that substantially all of the pulp in the fruit is subjected to the action of the reamer. Moreover, it is necessary to prevent the cup from engaging the reamer.

In order to obtain the proper clearance between the cup 27 and the reamer 18, I have provided a suitable bearing 37 on the reamer arranged to receive the lower end of the pin 29, that is, the lower end of the anchor 30, which preferably is of conical form, as shown. The bearing 37 is given a conical shape so as to conform in general to the shape of the anchor 30. The bearing 37, as shown, is formed in the metal of the base 19 of the reamer and is positioned in the axis of rotation of the shaft 20. It will be understood in view of the foregoing description that when the arm 32 is moved downwardly to its position shown in Fig. 2, the anchor pin 30 will be received in its bearing 37 so that further downward movement of the arm, and hence of the fruit, with reference to the reamer is prevented. The conical arrangement of bearing and pin does not substantially retard the rotary motion of the reamer.

It will be understood, of course, that the sizes of fruits vary. If the half fruit has substantially the same size as the cup 27, it will when the lever 32 is moved down be engaged by the reamer which will extract substantially all of the juice from the fruit, the rind or skin being received in the defined space between the reamer and the cup when the latter is in its lowermost position. If a smaller half fruit be placed within the cup, such as a half lemon, or a half lime, the reamer will engage the fruit as the handle 32 is lowered, and upon continued movement of the fruit toward the reamer will gradually stretch the skin and in some cases actually break the skin so as to spread it out against the cup 27 until it lies flat against the inner wall of the cup in the space between the reamer and the cup. On the other hand, if the half fruit be very large, such for example as a half grape-fruit, the fruit when first placed in the cup will lie in the outer portion of the cup with the bottom of the fruit spaced from the bottom of the cup. When the fruit is forced down on the reamer by the handle 32, the reamer will move upwardly into the fruit, and, as the cup moves down, will force the inner and bottom parts of the fruit up against the bottom of the cup; and here again, the rind will lie in the defined space between the reamer and the cup.

Therefore, irrespective of the size of the fruit that is being reamed, it will in each case be forced up into the cup so that the rind will lie against the cup in the defined space between the reamer and the cup. The bearing 37, therefore, insures a proper juice extracting operation for substantially all sizes of fruit within rather wide limits. The pulp and juice are reamed out of the rind which is retained in the cup by the impaling pins.

The arrangement of the standard 34 mounted on the power unit 10 is described and claimed in the copending application of Robert F. Bean, Serial No. 109,431, filed November 6, 1936, and assigned to the same assignee as this invention.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A fruit juice extractor comprising a reamer and a fruit support movable with relation to the reamer to bring the fruit on the support into extracting relation with the reamer, means for effecting relative rotary movement between the reamer and fruit holder to extract the juice from the fruit, and a bearing member on one of said members and a seat on the other to receive said bearing member to limit the movement of the support toward said reamer in bringing the fruit into extracting relation with the reamer, said bearing member and seat being so related as to offer substantially no resistance to the relative rotary movement between said holder and reamer.

2. A juice extractor comprising a rotary reamer, a cup-shaped fruit support having a cross-section conforming in general to the contour of said reamer, means mounting said cup for movement toward and away from said reamer, a pin in said cup, and a seat on said reamer arranged to engage said pin as the reamer rotates to limit the movement of said support toward said reamer while the latter is rotated and thereby define the minimum space between said cup-shaped support and said reamer.

3. A fruit juice extractor comprising a rotary juice extracting member having a plurality of extracting vanes extending radially from the axis of rotation of the member, a bearing seat on said member in said axis of rotation, a cup-shaped support arranged to receive the fruit and hold it in the cup, a supporting arm for said support arranged to move it to bring the fruit supported thereby into extracting relation with said reamer, and a pin in said cup arranged to be projected through the fruit supported in the cup and having on its end a bearing arranged to be received in said bearing seat to limit the movement of said support toward said reamer.

4. A juice extracting device comprising a juice collecting bowl, a rotary reamer in said bowl, a fruit holder, an arm supporting said fruit holder, a standard pivotally mounting said arm so that it can be moved from a retracted position to carry the fruit into extracting relation with said reamer, a bearing seat on said rotary reamer arranged while the reamer is rotating to engage a bearing on said holder to limit movement of the holder toward said reamer, and a stop on said standard arranged to engage said arm to define said retracted position.

JOY C. ADAMS.